(12) United States Patent
Rinko et al.

(10) Patent No.: US 11,060,678 B2
(45) Date of Patent: *Jul. 13, 2021

(54) MODULAR LUMINAIRE, RELATED MODULE, SYSTEM AND LIGHTING APPARATUS

(71) Applicant: Oy MTG-Meltron Ltd, Helsinki (FI)

(72) Inventors: Kari Rinko, Helsinki (FI); Leo Hatjasalo, Helsinki (FI); Jaana Jahkonen, Espoo (FI)

(73) Assignee: OY MTG-MELTRON LTD., Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,401

(22) Filed: Jan. 17, 2020

(65) Prior Publication Data

US 2020/0154549 A1 May 14, 2020

Related U.S. Application Data

(63) Continuation of application No. 15/570,492, filed as application No. PCT/FI2016/050279 on May 2, 2016, now Pat. No. 10,561,000.

(Continued)

(51) Int. Cl.
*F21S 8/08* (2006.01)
*F21V 5/00* (2018.01)
(Continued)

(52) U.S. Cl.
CPC ............ *F21S 8/086* (2013.01); *F21S 8/085* (2013.01); *F21V 5/007* (2013.01); *F21V 5/08* (2013.01);
(Continued)

(58) Field of Classification Search
None
See application file for complete search history.

(56) References Cited

U.S. PATENT DOCUMENTS 8,931,919 B2   1/2015   Rami et al.
2005/0231948 A1  10/2005  Pohlert et al.
(Continued)

FOREIGN PATENT DOCUMENTS

EP   1213773 A1   6/2002
EP   2565526 A1   3/2013
(Continued)

*Primary Examiner* — Jany Richardson
(74) *Attorney, Agent, or Firm* — Thomas | Horstemeyer

(57) ABSTRACT

A luminaire incorporating a plurality of lighting module units, each module comprising a plurality of preferably independently controllable light sources, optionally LEDs and/or laser lamps, each light source having preferably dedicated lens structure associated therewith, wherein the modules are individually configurable and further wherein the light output characteristics of each module of said plurality are individually controllable to yield a target overall distribution of output light from the luminaire. Yet, it is presented a lighting apparatus comprising a single point-like light source, preferably a LED, and a transmissive lens structure optically connected to said light source defining a plurality of optically functional, mutually different segments dedicated for controlling the light, e.g. distribution and direction, originally emitted by said single light source. A corresponding transmissive element such as a lens is presented.

19 Claims, 11 Drawing Sheets

Related U.S. Application Data

(60) Provisional application No. 62/154,920, filed on Apr. 30, 2015.

(51) Int. Cl.
| | | |
|---|---|---|
| *F21V 23/04* | (2006.01) | |
| *F21V 5/08* | (2006.01) | |
| *H05B 47/105* | (2020.01) | |
| *H05B 45/10* | (2020.01) | |
| *H05B 47/19* | (2020.01) | |
| *G02B 3/04* | (2006.01) | |
| *G02B 19/00* | (2006.01) | |
| *F21W 131/103* | (2006.01) | |
| *F21Y 115/10* | (2016.01) | |
| *H04W 4/80* | (2018.01) | |

(52) U.S. Cl.
CPC ............ *F21V 23/0442* (2013.01); *G02B 3/04* (2013.01); *G02B 19/0014* (2013.01); *G02B 19/0061* (2013.01); *H05B 45/10* (2020.01); *H05B 47/105* (2020.01); *H05B 47/19* (2020.01); *F21W 2131/103* (2013.01); *F21Y 2115/10* (2016.08); *H04W 4/80* (2018.02)

(56) References Cited

U.S. PATENT DOCUMENTS

| | | |
|---|---|---|
| 2011/0164426 A1 | 7/2011 | Lee |
| 2014/0265874 A1* | 9/2014 | Marquardt ............ H05B 47/19 315/153 |
| 2015/0008829 A1* | 1/2015 | Lurie ..................... F21S 8/086 315/153 |

FOREIGN PATENT DOCUMENTS

| | | |
|---|---|---|
| JP | 2008108674 A | 5/2008 |
| JP | 3154402 U | 10/2009 |
| JP | 2013037918 A | 2/2013 |
| JP | 2014063456 A | 4/2014 |
| WO | 2008050850 A1 | 5/2008 |
| WO | 2008155697 A2 | 12/2008 |

* cited by examiner

PRIOR ART

102

104

106

108

Area 1 204
- Starts from the origin
- Radius of first groove r = 0.5 mm
- Origin
- Grating is continuous and extends up to 11.9 mm ± period from origin
- Groove specifications are on the left
- Period = 19.11 μm 26.16° 5° h = 9 μm
Substrate

Area 2 206
- Starts where area 1 ends
- Radius of first groove r = 11.9 mm ± period
- Grating is continuous and extends to the end of the component
- Groove specifications are on the left
- Period = 10.67 μm Figure not in scale
5° 23.23° h = 9 μm
Substrate

Area 3 208
- Does not start from the origin
- Radius of first groove r = 16.22 mm
- Grating is continuous and extends to the end of the component
- Groove specifications are on the left
- Period = 7.93 μm 51.57° 5° h = 9 μm
Substrate

FIG. 2B

Area 1 — 304

- Starts from the origin
- Radius of first groove r = 0.5 mm

- Grating is continuous and extends up to 31.5 mm ± period from origin
- Groove specifications are on the left
- Period = 67.35 μm (Figure not in scale: 7.70°, 5°, h = 9 μm, Substrate)

Area 2 — 306

- Starts where area 1 ends
- Radius of first groove r = 31.5 mm ± period

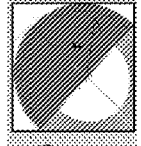

- Grating is continuous and extends to the end of the component
- Groove specifications are on the left
- Period = 28.91 μm (Figure not in scale: 25.51°, 48.14°, h = 9 μm, Substrate)

Area 3 — 308

- Does not start from the origin
- Radius of first groove r = 20.87 mm

- Grating is continuous and extends to the end of the component
- Groove specifications are on the left
- Period = 148.36 μm (Figure not in scale: 3.49°, 5°, h = 9 μm, Substrate)

| $L_m$ [cd/m²] | U0 | UI | TI [%] |
|---|---|---|---|
| 1.05 | 0.50 | 0.66 | 13 |
| ≥ 1.00 | ≥ 0.40 | ≥ 0.60 | ≤ 15 |
| ✓ | ✓ | ✓ | ✓ |

904

| $L_m$ [cd/m²] | U0 | UI | TI [%] |
|---|---|---|---|
| 0.90 | 0.45 | 0.53 | 14 |
| ≥ 1.00 | ≥ 0.40 | ≥ 0.60 | ≤ 15 |
| ✗ | ✓ | ✗ | ✓ |

MODULAR LUMINAIRE, RELATED MODULE, SYSTEM AND LIGHTING APPARATUS

PRIORITY

This application is continuation application of U.S. application Ser. No. 15/570,492, filed on Oct. 30, 2017 and claiming priority of international application number PCT/FI2016/050279, filed on May 2, 2016 and provisional application Ser. No. 62/154,920, filed on Apr. 30, 2015, the contents of all of which are incorporated herein by reference.

FIELD OF THE INVENTION

The present invention generally relates to illumination and lighting. Especially, however not exclusively, the invention pertains to a luminaire incorporating multiple light units, modules and a lighting apparatus incorporating a light source and a lens structure for use in such.

BACKGROUND

By lighting or illumination it is typically referred to the art of exploiting light in producing a decorative or functional effect.

Traditionally lenses for artificial, man-made light sources such as bulbs, LEDs (light emitting diode), etc. have been designed as simple, symmetrical elements of suitable material such as plastics or glass. FIG. 1 depicts a typical lens associated with a point-like light source such as a LED 108 from different angles. From the axonometric view 102 and top view 104 the uniformity of a contemporary lens structure can be easily investigated. Further with reference to a side view 106, such flat (the shown case), concave, or convex lens contains even surface or at most, it may incorporate a constant optically functional pattern such as micro grooves or gratings. Such solutions have been relatively straightforward to develop and fabricate while still functioning relatively well in terms of light transmission, coarse refraction and light source protection objectives, but from the standpoint of arisen contemporary requirements set for illumination what comes the energy efficiency, light pattern controllability, light fixture size, etc., these simple conventional lenses have clearly become sub-optimum and new solutions are required. The optics have seemingly lagged behind the development of the actual light sources such as LEDs and their various further forms.

The aforementioned controllability of light has indeed gained importance significantly during the last few decades. For example, in the context of so-called intelligent outdoor lighting, specifically street lighting, light output may be adaptively adjusted based on factors such as street usage and even road conditions. Lights that activate automatically in the dark have been around for a while now. Also timers have been used for turning lights on/off. Cameras, photoresistors or other sensors may be functionally connected to the lighting equipment for enabling dynamic control over the light sources via appropriate adjustment measures. Similar considerations may be applied to many different indoor lighting scenarios e.g. in industrial premises, offices, houses, public places, etc. not forgetting special environments such as underwater lighting.

By more sophisticated control of light sources, a multitude of benefits in terms of e.g. reduced energy usage and light pollution may be obtained.

Street lights have been commonly implemented as lampposts on the edge of a road. Traditional lamps such as HPS (high-pressure sodium) lamps that have been available for fifty years now have recently faced competition from more modern options including LEDs. LEDs are, as such, relatively durable and energy efficient regarding particularly their scotopic lumen efficiency, but in many ways the available large scale solutions adopting LEDs have so far still been immature and inadequate what comes to the overall illumination power or luminous flux, and also controllability. Therefore, there still remains much to do in the context of light optimization having regard to a myriad of conditions where lighting is generally preferred if not absolutely necessary.

SUMMARY

An object of the present invention is to at least alleviate one or more of the aforesaid problems relating to the prior art.

The objective of the present invention can be achieved by the features of independent claims.

According to an embodiment, a luminaire comprises a plurality of lighting module units, each module comprising a plurality of preferably independently controllable light sources, optionally LEDs and/or laser lamps, each light source advantageously having an exclusively dedicated lens structure associated therewith (light source and associated lens structure may thus establish at least a part of a lighting apparatus in accordance with the present invention), wherein the modules are advantageously individually configurable and in particular wherein the light output characteristics of each module of said plurality are advantageously individually controllable to yield a target overall distribution of output light from the luminaire.

The configuration may also be dynamically controllable so that the configuration may adapt, for example, to the prevalent conditions (based on e.g. sensor data) or to the received control signals/commands in e.g. real-time or almost real-time fashion. Dynamic controllability may include automated control and/or manual, preferably still remotely operable, control over the selected features of the luminaire, e.g. the light sources. The luminaires may be provided with appropriate electronics for the purpose.

The luminaire may define, incorporate or be included in a street light such as a lamppost, or other outdoor luminaire, or alternatively indoor luminaire. The luminaire may be static or fixed, or portable by nature.

A system comprising a plurality of luminaires may be established. The luminaires may be configured to communicate with each other and/or with a remote control entity.

Having regard to the independent configurability of the modules, at least one first module of the modules may be configured for near-field illumination and at least one second module of the modules may be configured for far-field illumination. Generally, different modules and associated light sources (included in the modules) with different configurations (emission/radiation properties, alignment, control, etc.) may be thus utilized for different illumination segments.

Multiple lens structures of a module of a luminaire may define a lens matrix that serves a plurality of light sources such as LEDs. Optionally all the lens structures may define a lens matrix or several lens matrices. The lens structures of a matrix may physically have at least one common element such as common substrate.

Individual lens structure and/or matrix design may be applied for the light sources of each module. The modules may thus contain mutually different lenses/lens matrices associated with the light sources. Preferably even within a module the light sources may be associated with dedicated, mutually different lens structures. Advantageously asymmetric lens design may be harnessed for obtaining asymmetric light distribution for e.g. near- and far-field illumination. The use of different lens combinations may provide rather extreme light characteristics in terms of e.g. light distribution and uniformity, when desired.

Individual control of a module's (emission) wavelength, practically color, may be provided in the luminaire. For example, multiple light sources with different (emission) colors may be utilized in the module and controlled independently to achieve the desired overall color characteristics. Optionally, light source(s) with adjustable emission color could be utilized in the module(s). In some embodiments, different modules could be utilized in the luminaire for emitting associated dedicated, mutually at least partially different wavelengths of light.

At least one module may have been configured to a first constructive positioning angle different from the constructive positioning angle of at least one other module. The constructive positioning angle of a module affects e.g. the emission direction (symmetric or asymmetric) of the associated light sources (which may optionally be substantially same at least within a group of light sources), and total illumination distribution and uniformity of the overall luminaire cooperatively with multiple modules. Additionally or alternatively, light sources and/or related optics (e.g. associated lens structures) within a module may be positioned mutually differently having regard to e.g. alignment thereof.

Light output of a module and/or an individual light source within the module may preferably be individually controlled in terms of at least one associated property selected from the group consisting of: current supplied, voltage supplied, power supplied, radiant flux, luminous flux, luminous intensity, illuminance, and luminance.

Individual electric control for each light source and/or associated module may be effectuated by means of a multi-channel system. At least one dedicated (control) channel may be allocated to each module. This individual module control enables to optimize, for instance, far-field module and near-field module cooperative integrated illuminance efficiency, distribution and uniformity to reach the preferable level in accordance with e.g. illumination/lighting standard requirements.

Each luminaire and optionally module may be associated with individual id (identifier) such as address relative to the control system or control network of the luminaires for enabling independent control.

Variable lumen factors or generally characteristics may be applied to each module and/or light source thereof.

A preferably variable cooling arrangement may be utilized in connection with the luminaire. Each module may advantageously be controlled individually from the standpoint of cooling. The luminaire and/or each module thereof may apply or contain at least one, preferably dedicated cooling mechanism selected from the group consisting of: convection, fan, heat sink, cooling fin, heat pipe, and loop heat pipe. Variable cooling platform materials and/or contacts may be used, for instance.

A tailored software tool can be provided for optimizing the configuration of the luminaire having regard to e.g. included modules (type, nature, number, alignment/positioning, driving currents, etc.) to achieve the set performance objectives. This tool may be configured to support fast and accurate simulations and thus make modular illumination easy and flexible for e.g. different road classes or other illumination needs. The same overall solution may be thus suitable and easily adjusted for most applications. It may omit need to design a huge variety of different modules and generally luminaires for wider roads or for higher poles, for example, as the same building blocks such as modules may be dynamically selected and configured for use in each scenario with optimal parameters to achieve the current illumination goal.

The aforesaid design or simulation tool such as software (computer program product preferably provided on a tangible, non-transitory carrier medium such as optical disc or memory card) may thus be provided for optimizing the configuration of the luminaire, modules therewithin and/or light sources of the modules from the standpoint of illumination objectives in the target environment. Design criteria may be input by the user so that the tool is capable of determining and then suggesting a configuration that meets the criteria. Alternatively or additionally, different luminaire configurations may be tested through simulations by the tool. The tool preferably has a graphical UI for easy control data input and results visualization via graphs, for instance.

At least one sensor may be included in or at least functionally connected to a luminaire. The sensor may include at least one sensing element selected from the group consisting of: light or lightness sensor, motion sensor, vehicle sensor, traffic sensor, pedestrian sensor, sound sensor/microphone, heat sensor, infrared sensor, temperature sensor, humidity sensor, rain sensor, icing or ice sensor, weight sensor, wind sensor, vibration sensor, current sensor, voltage sensor, and power sensor.

At least one controller or controlling unit including at least one processing unit, such as a microcontroller, microprocessor, or a signal processor (e.g. a DSP, a digital signal processor), may be included in or at least functionally connected to a luminaire and/or certain/each module thereof. The controller may include memory, optionally integrated with the processing unit(s) and/or provided as separate memory units, typically chips.

At least one communications unit or communications interface such as a receiver, transmitter, and/or a transceiver may be included in or connected to the luminaire. The communications interface may be wired or wireless. It may follow a predetermined wireless communications standard such as a cellular standard, e.g. 3G, 4G, GSM (Global System for Mobile Communications), UMTS (Universal Mobile Telecommunications System) or some other cellular standard. Alternatively or additionally it may adhere to ZigBee™ WLAN (Wireless Local Area Network), and/or Bluetooth™ Bluetooth LE (Low Energy)™ standard, or some other technology supporting e.g. short-range wireless data transfer.

The communications interface may be configured to communicate with a remote control system or device, which may be a central one, i.e. the central entity may control/communicate with a plurality of luminaires.

The luminaire may be balanced or otherwise optimized in terms of weight distribution so that heavier elements and/or elements that do not have to be located at elevated height from the ground or other installation platform, such as electronics, may be located closer to the ground/platform level, preferably substantially at the ground/platform level or at least within a predefined, limited distance therefrom, such as one or two meters therefrom. The electronics may be located within the body of the luminaire or physically and/or functionally connected, optionally fastened, thereto having at least partially separate housing.

According to one embodiment of the invention a lighting apparatus suitable for inclusion in e.g. the aforesaid module of the luminaire, potentially in greater numbers, comprises a single preferably point-like light source, most preferably a LED, and a transmissive lens structure optically connected to said light source defining a plurality of optically functional, mutually different segments dedicated (exclusively assigned) to said single light source for controlling the light distributed and directed therefrom.

The apparatus may establish at least part of a lighting device package, e.g. a LED package. The light source and lens structure may be integrated together directly and/or via intermediate elements (support, body, etc.) of the package. The light source may include e.g. a LED chip, or 'die'. The lens may be located at a distance from the actual LED chip. Alternatively, it may at least partially encapsulate the LED die and optionally further elements such as a related substrate, wiring, pads, control/driver electronics, etc. The lens material may in some embodiments substantially contact the LED chip or be separated therefrom by a gap of intermediate material that may be gaseous, fluidic, fluid, solid, or gel/gelatinous.

The lens may be substantially planar or 'flat'. Alternatively, it may bear true, more complex 3D shape as well potentially having asymmetric shape(s). The lens may comprise one or more materials, e.g. plastic, silicone, or glass. It may be monolithic.

The segments may be different in terms of structural features. They may have mutually different volumes and/or surface areas in terms of size, shape and related optically functional features such as patterns, optionally surface relief patterns, embedded reliefs or features, isolated forms/profiles, and/or cavity optics. The actual optical functions between the segments may vary as well. Multiple segments may be internally and/or mutually symmetric relative to a common reference, or be asymmetric.

The lens structure may further contain a number of segments free of e.g. surface relief forms.

The patterns of different segments may contain mutually different relief forms, alignment of forms, scale/dimensions of forms, and/or density or period of forms.

The relief forms may define single profiles, connected profiles, combined, overlapping or hybrid profiles, nested profiles, grooves, protrusions, slanted profiles, rectangular profiles, blazed profiles, blazed grating profiles, refractive Fresnel profiles, diffractive grating profiles, symmetric profiles, asymmetric profiles, and/or refractive profiles.

In addition to or instead of surface features, a number of optical features may be embedded in the segments as already alluded to above. The embedded optical features include e.g. particles, patterns and cavities such as air or other gaseous, fluidic, gel, or solid cavities of different material/substance than the neighbouring solid matter of the lens. The boundary of a cavity and (solid) neighbouring lens material may indeed define internal relief forms within the lens structure.

The lens structure may define a single layer lens or a multi-layer lens from a single or multiple pieces of material optionally joined together. Physically, a number of different layers may be first designed and provided with different optical features and then joined together by suitable methods such as lamination. Alternatively, a functional multi-layer structure may be established by processing already integral or even monolithic piece of material at different depths to obtain the desired layers.

A segment and/or a related feature such as a surface (relief) pattern, surface form, or an embedded feature may be configured to implement at least one function selected from the group consisting of: light management, directing, collimation, diffusing, diffracting, coloring (e.g. from white light) and scattering.

The size of the afore-discussed features may be in the order of magnitude of sub-microns or even several microns depending on the embodiment, for example.

The desired minimum transmittance of the lens depends on the embodiment and may be at least about 50%, 60%, 70%, 80%, 85%, 90%, or even 95% having regard to the target wavelengths. Yet, the lens may be optically transparent (transmittance e.g. in the order of magnitude of 90% or higher) or translucent with considerable light scattering properties. The lens may be colored or have a coloring function. The light source may emit white light and/or light of another color/wavelength, e.g. infrared light. Thus visible and/or invisible light emitting source may be used.

The utility of the present invention arises from a variety of factors depending on each particular embodiment thereof.

The proposed solution can be utilized flexibly in a great variety of use environments. It is preferably (re-)configurable and modular. The applicable use scenarios include e.g. outdoor lighting environments such as street lighting as well as indoor lighting environments in public, private, industrial, etc. locations.

In terms of luminaire production and manufacturing, the present solution offers clear benefits over the prior art. Same components, such as modules, may be manufactured and used in the luminaires notwithstanding the actual use scenarios thereof, falling under different road classes, for instance. Accordingly, from a common selection of modules and potentially other elements, e.g. poles, the most suitable ones may be selected in desired numbers and then afterwards optimized to the actual use scenario as the solution offers electrical (e.g. current to light sources), optical and mechanical adjustment options to enable optimum illumination performance such as light distribution in a variety of conditions without a need to manufacture special components for each target environment and use case. For example, the module angle may be mechanically/structurally adjusted as described in further detail hereinlater.

In connection with street lighting, the proposed solution is suitable for practically all road classes having e.g. different optical surface characteristics (diffusion properties etc.) and other environments to achieve excellent efficiency and adaptive, solid performance.

Dynamic adjustability provides for active illumination, where real-time modifications to the run-time parameters of the solution easily cater for changeable conditions, e.g. dry and wet road conditions with different preferred illumination characteristics in view of e.g. visibility maximization and glare minimization. Dynamic configurability thus generally facilitates stabilizing e.g. illumination performance in variable conditions.

Further advantageous features of the present invention include light weight construction, optimal weight distribution and stress load, because a number of elements such as electronic elements including controllers and/or (other) heavy components may be situated on the ground/installation level either internal or external to the luminaire. Thus the actual illumination portion may be much lighter than in most other commercial solutions. Also wind load may kept low, which makes possible to utilize lighter weight construction. Indeed, various aesthetic/design and functional factors are achievable with the construction of the suggested luminaire.

The suggested solution bears several configurable parameters/variables, which can be easily modified and optimized use case specifically. Many of these factors may be advantageously controlled using the design and/or control software that may be supplied with the solution, as a part thereof, or separately. The parameters/variables that are preferably user adjustable affect illumination conditions such as light distribution, uniformity, stray light, dazzle light, efficiency, luminance/illuminance e.g. having regard to different road roughness conditions, power consumption, color temperature, rendering index, light source temperature, light pollution, etc.

Having regard to lighting module internals, optical design of lighting apparatuses included in the modules and containing a light source such as LED is increasingly important in the field of lighting. The present solution addresses that global need in a novel manner. Even light outcoupled from a single point-like light source such as LED may be accurately and thoroughly controlled by an embodiment of the present invention. The novel lens design may contain many different segments defining discrete areas having different optical features for light management, light directing or directivity enhancing, collimating, and diffusing purposes among other options. This single light source based solution enables to provide asymmetric and generally preferred light distribution for illumination. Uniformity of distributed light may be controlled. A large uniform distribution may be constructed by a multi-LED solution comprising a plurality of the suggested lighting apparatuses, each having its own dedicated/individual (even unique) lens structure in order to control the distributed light properly. The apparatuses of the multi-LED solution may be jointly controlled by applicable control electronics.

Various other advantages will become clear to a skilled person based on the following detailed description.

The expression "a number of" refers herein to any positive integer starting from one (1), e.g. to one, two, or three.

The expression "a plurality of" refers herein to any positive integer starting from two (2), e.g. to two, three, or four.

The terms "first" and "second" do not denote any order, quantity, or importance, but rather are used to distinguish one element from another.

The expression "a number of" may herein refer to any positive integer starting from one (1).

The expression "a plurality of" may refer to any positive integer starting from two (2), respectively.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will likely be best understood from the following description of specific embodiments when read in connection with the accompanying drawings.

BRIEF DESCRIPTION OF THE DRAWINGS

FIG. 2B depicts surface design options, related parameters and shapes for the embodiment of FIG. 2A.

FIG. 3B depicts surface design options, related parameters and shapes for the embodiment of FIG. 3A.

DETAILED DESCRIPTION

Figure 1:
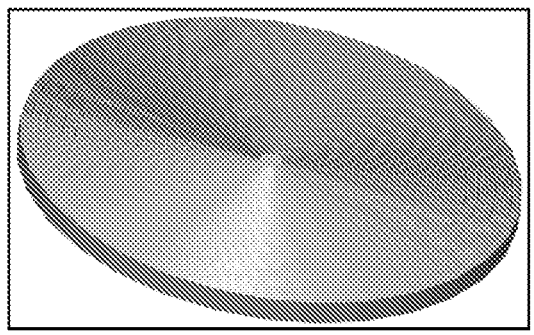
FIG. 1 illustrates an embodiment of a lighting arrangement in accordance with prior art.
Figure 1:
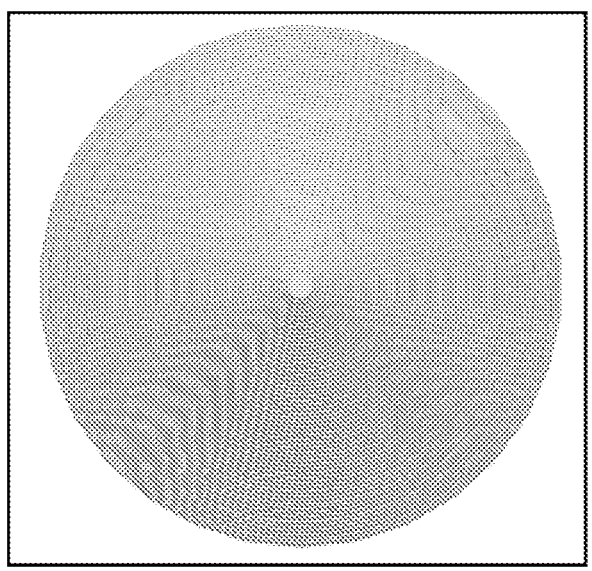
Figure 1:
Figure 1:
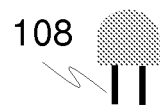

FIG. 1 was already discussed hereinbefore.

Reverting to various embodiments of the present invention, the suggested optically transmissive element, e.g. a lens, to be utilized in the embodiments of suggested lighting apparatuses and luminaires incorporating a plurality of such, may generally be substantially planar, e.g. of a planar/low-height cylindrical shape. Further, it may be curved or contain curved shapes. It may define a substantially circular surface area on one or two opposing sides thereof. At least it may have a circular cross-section. Alternatively, other shapes may be utilized, e.g. angular such as rectangular, triangular, hexagonal or generally polygonal shapes regarding the cross-section and/or the surface(s).

A segment may define a discrete (functionally, structurally and/or visually distinguishable) half circle area (or have a half circle projection) on the lens surface. Alternatively, a segment may define a quarter circle or area of some other shape with e.g. (straight) line and/or curve type boundary with a neighbouring segment or the environment. A segment is adjacent to at least one other segment of the lens.

The lens is designed for serving a single point-like light source such as LED, but many LED+ lens combinations can be conveniently brought together to generate a larger illumination fixture preferably having common housing. Preferably the light source is electrically driven.

Figure 2A:
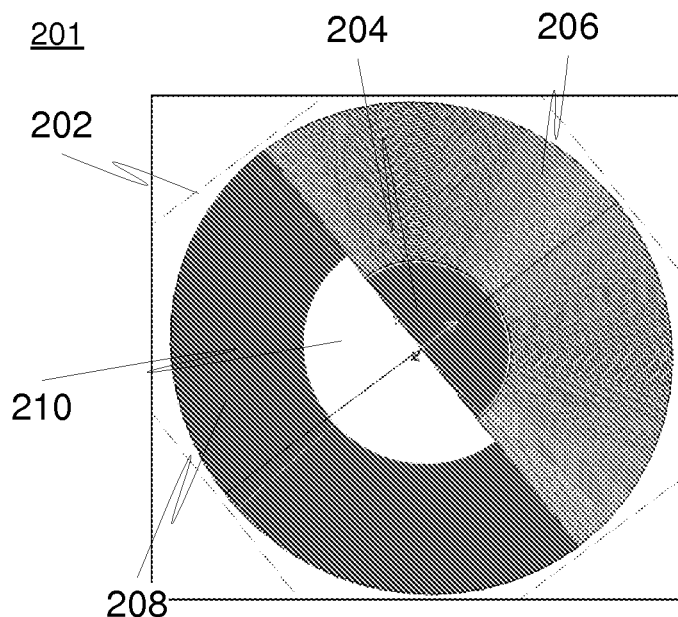
FIG. 2A illustrates an embodiment of a lighting apparatus in accordance with the embodiment of the present invention.

FIG. 2A illustrates, via a top/plan view, an embodiment of a lighting apparatus 201 in accordance with the embodiment of the present invention. Especially the transmissive element (preferably lens) 202 is shown in the figure. Light source itself, typically only a single LED, is now shown in the figure as it does not, as such, form the inventive core of this embodiment, but e.g. the sketch 106 of FIG. 1 incorporating LED 108 is applicable also here what comes the coarse positioning of the light source relative to the lens 202, i.e. the lens 202 is at least optically connected to the LED so that the light emitted therefrom is incident on the lens 202, propagates through the lens 202 and is finally emitted or 'out-coupled' therefrom with desired properties regarding e.g. distribution, direction, collimation, diffusion, color or frequency, etc. The lens 202 is thus configured for controlling the light (e.g. distribution and direction) originally emitted by the single light source.

At this point, it is generally noteworthy to mention that the lens structures in accordance with embodiments of the present invention may optionally contain functional coating (s) and/or film(s), the function of which may be optical, protective, anti-scratch, moisture repelling (hydrophobic), etc.

Reverting to FIG. 2A, the embodiment comprises three segments 204, 206, 208 for light management. In this example, each segment defines a half circle area, each area having a different period and profile of grating grooves thereon. The surface (relief) patterns of the segments 204, 206, 208 may be considered to form an overall or aggregate surface pattern of the whole lens surface.

Within the area of a segment the period and pattern/profile of the relief forms remain unchanged. For instance, the provided grooves may be few microns, e.g. about 9 μm deep, and may rotate around the origin thus following the general form of the segment. Diameter of the overall component may be about 70 mm, for example. A person skilled in the art will acknowledge the fact, however, that in some embodiments the diameter may only be e.g. few millimetres while in some others e.g. hundreds of millimetres.

FIG. 2B depicts surface design options, related parameters and shapes for the areas 1, 2 and 3 of the respective segments 204, 206, 208 of the embodiment of FIG. 2A. Groove periods range from about 8 microns to about 20 microns. Gratings within the areas are continuous.

Area 1 of segment 204 starts from the origin (e.g. a centre of lens surface) whereas areas 2 and 3 of segments 206, and 208 do not as they begin further away therefrom. The lens 202 may have an empty area 210 free of optically functional features between the segments 208 and 206, 204. Alternatively, the numeral 210 may refer to a dent, cavity or even a through-hole in the lens structure 202.

Figure 3A:
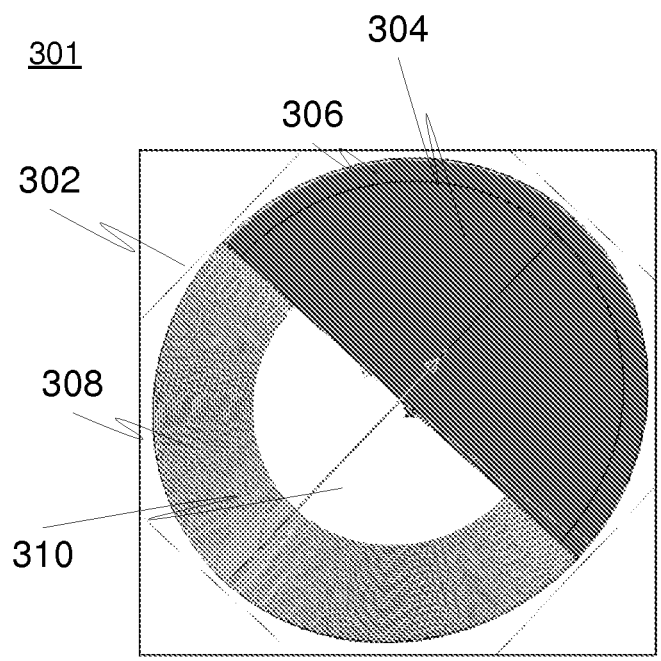
FIG. 3A illustrates another embodiment of a lighting apparatus in accordance with the present invention.

FIG. 3A illustrates, via a top/plan view, another embodiment of a lighting apparatus 301 in accordance with the present invention. Especially the transmissive element (lens) 302 is shown in the figure.

The embodiment comprises three segments 304, 306, 308 for light management. The surface (relief) patterns of the segments 304, 306, 308 may be considered to form an overall or aggregate surface pattern on the lens surface. Generally the grooves may be similar to the ones of FIG. 2A.

FIG. 3B depicts surface design options, related parameters and shapes for the areas 1, 2 and 3 of the respective segments 304, 306, 308 the embodiment of FIG. 3A. Groove periods range from about 29 microns to about 67 microns. Gratings within the areas are continuous.

Area 1 of segment 304 starts from the origin (centre of lens surface) whereas areas 2 and 3 of segments 306, and 308 do not as they begin further away therefrom. The lens 302 may have an empty area 310 free of optically functional features between the segments 308 and 306, 304. Alternatively, the numeral 310 may refer to a dent, cavity or even a through-hole in the lens structure 302.

Figure 4:
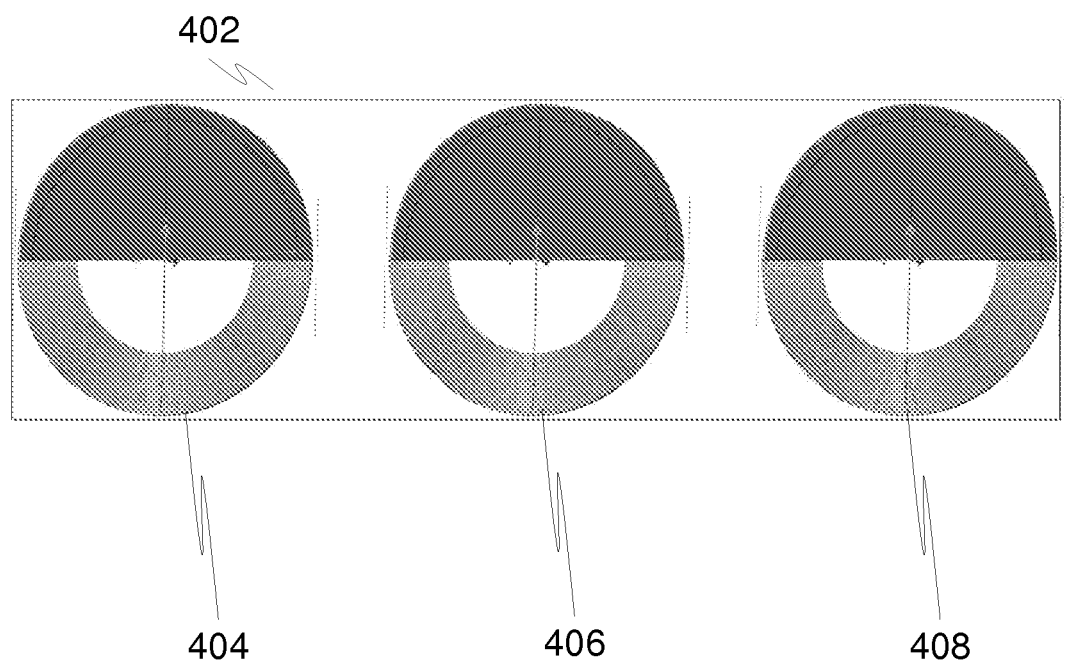
FIG. 4 depicts an embodiment of a multi-LED solution with multiple light sources, each allocated with a dedicated lens structure.

FIG. 4 depicts an embodiment of a multi-LED solution 402 with multiple lighting apparatuses described hereinbefore, potentially integrated within common housing, each apparatus comprising a dedicated light source allocated with a dedicated lens structure 404, 406, 408. The lenses may, as a whole, establish a lens matrix. Two or more lenses 404, 406, 408 of the matrix may be mutually similar (shown case) or different. The multi-LED solution may establish at least part of a module to be included in an embodiment of a luminaire in accordance with the present invention.

Figure 5:
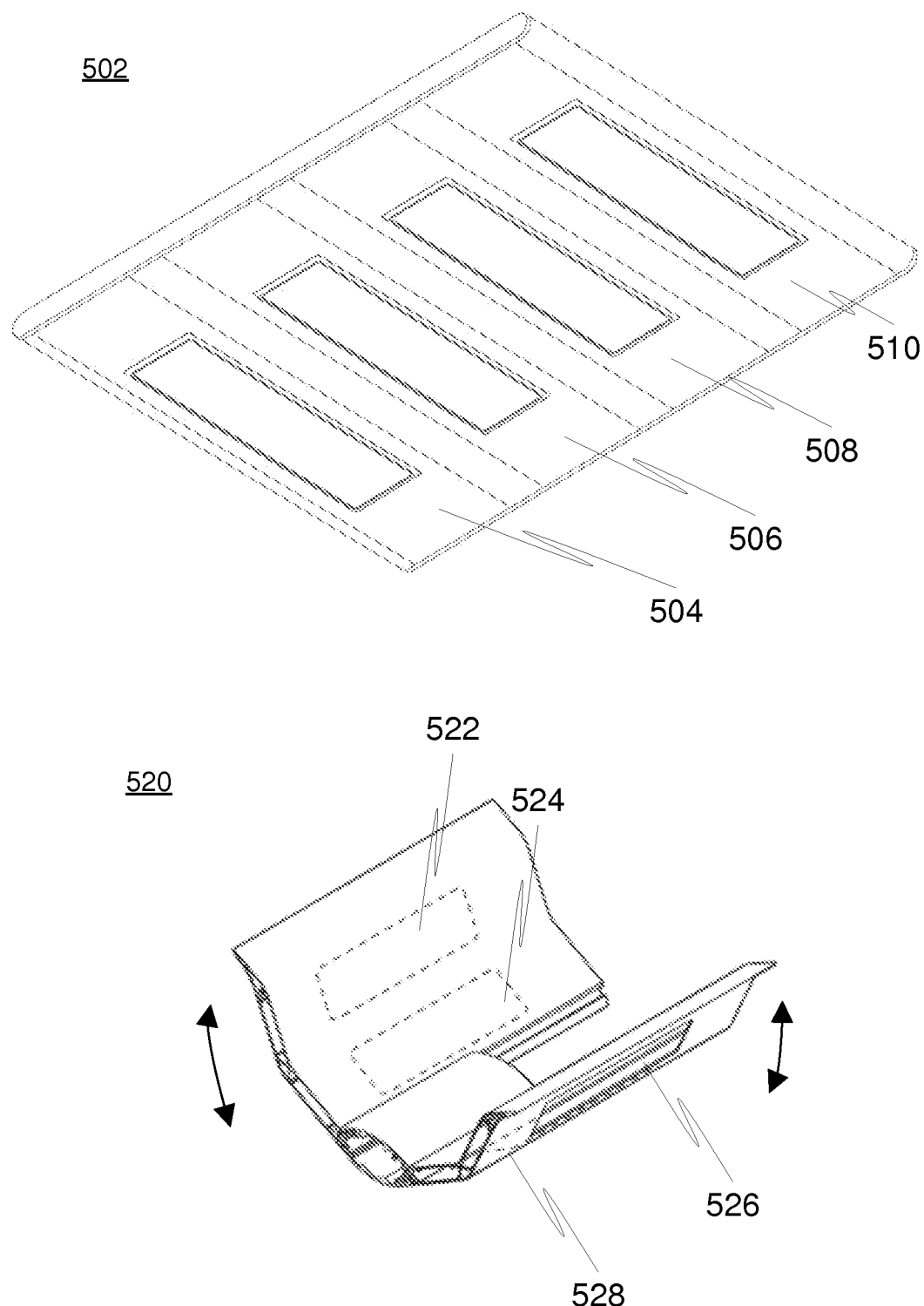
FIG. 5 illustrates two embodiments of a luminaire in accordance with the present invention.

FIG. 5 illustrates two embodiments 502, 520 of a luminaire in accordance with the present invention.

Both embodiments 502 (plate design), 520 ('bird' or 'seagull' design) comprise several lighting modules 504-510, 522-528, respectively, with individual configuration having regard to e.g. positioning, alignment, the number and characteristics of light sources included, control parameters such as current selected, etc.

The modules 504-510, 522-528 may be preferably removably connected (e.g. with screws, bolts or clips) together or to a common housing or body to establish the final luminaire. In some embodiments, at least one of the modules could, however, be substantially permanently fastened with the luminaire by molding or adhesive, for instance.

As indicated in the figure by the curved bi-directional arrows, the angles of the modules 522-528 of embodiment 520, so-called 'wing angles', are preferably constructively adjustable relative to the fixed body, pole, transverse arm, or other portion of the luminaire so that the positioning angle also towards the environment to be illuminated changes as desired.

Between such may be thus provided an angle adjustment or alignment mechanism such as a hinge, joint, etc. with sufficient locking mechanism (e.g. wedge or pin). The mechanisms may be mechanical and/or electrical (e.g. servo-controlled, to enable automated and/or remote control). Accordingly, the distribution of luminaire/module-emitted light in the environment may be conveniently adapted, upon implementation for example, to each particular use scenario, e.g. having regard to the applicable road class, which may be associated with a certain number of lanes, poles of certain height, etc.

Generally, the modules 504-510, 522-528 may contain internal and/or integrated alignment means (e.g. rotatable hinges) or the body may contain adjustable suspension element for the purpose so that the positioning or alignment of the module may be conveniently (re-)configured. For the adjustable connection, suitable elements such as the aforesaid screws, bolts, clips, snap fasteners, etc. may be utilized.

The luminaires 502, 520 may exhibit a substantially planar shape 502 or a shape of more three-dimensional element 520 having e.g. substantially curved such as broadly 'u'-shaped ('seagull' design) cross-section containing adjoining substantially linear segments. The shape shall be selected based on use case illumination and environmental requirements, for example. Wind load may be minimized by optimally aligned, shaped/curved and/or dimensioned surfaces, for example. E.g. the size of the surface areas may be minimized and/or the larger surfaces aligned preferably parallel to a typical wind direction.

The luminaires 502, 520 may contain metallic and/or plastic housing material, for example. Necessary insulation capability having regard to moisture, dirt, etc. shall be verified. The light emitting portions (shown as rectangular forms in the figure) that may extend over and/or define at least portion of the outer surface of the modules, shall contain optically sufficiently transparent or translucent material cover, e.g. of glass or plastic material. Suitable minimum transmittance figures have been generally contemplated already hereinbefore. Indeed, in some embodiments, at least one of the modules 504-510, 522-528 has a dedicated separate protective cover piece over one or more underlying lighting apparatuses having their own optical elements such as lens structures or matrices in connection with light sources as discussed earlier. In some other embodiments, the cover layer may be integral with the lighting apparatus (source) optics.

The shown luminaires 502, 520 may and in many application will further incorporate or be at least connected to a support structure (not shown in this figure for clarity reasons) such as mast, pole, post, if not being directly attached to a support surface in the use environment such as the ceiling of a building or other host surface from the portion visible in the figure. Further configurability may be provided to the joint between the shown portion and the support structure, such as an adjustable ball joint or a bellows type joint.

Figure 6:
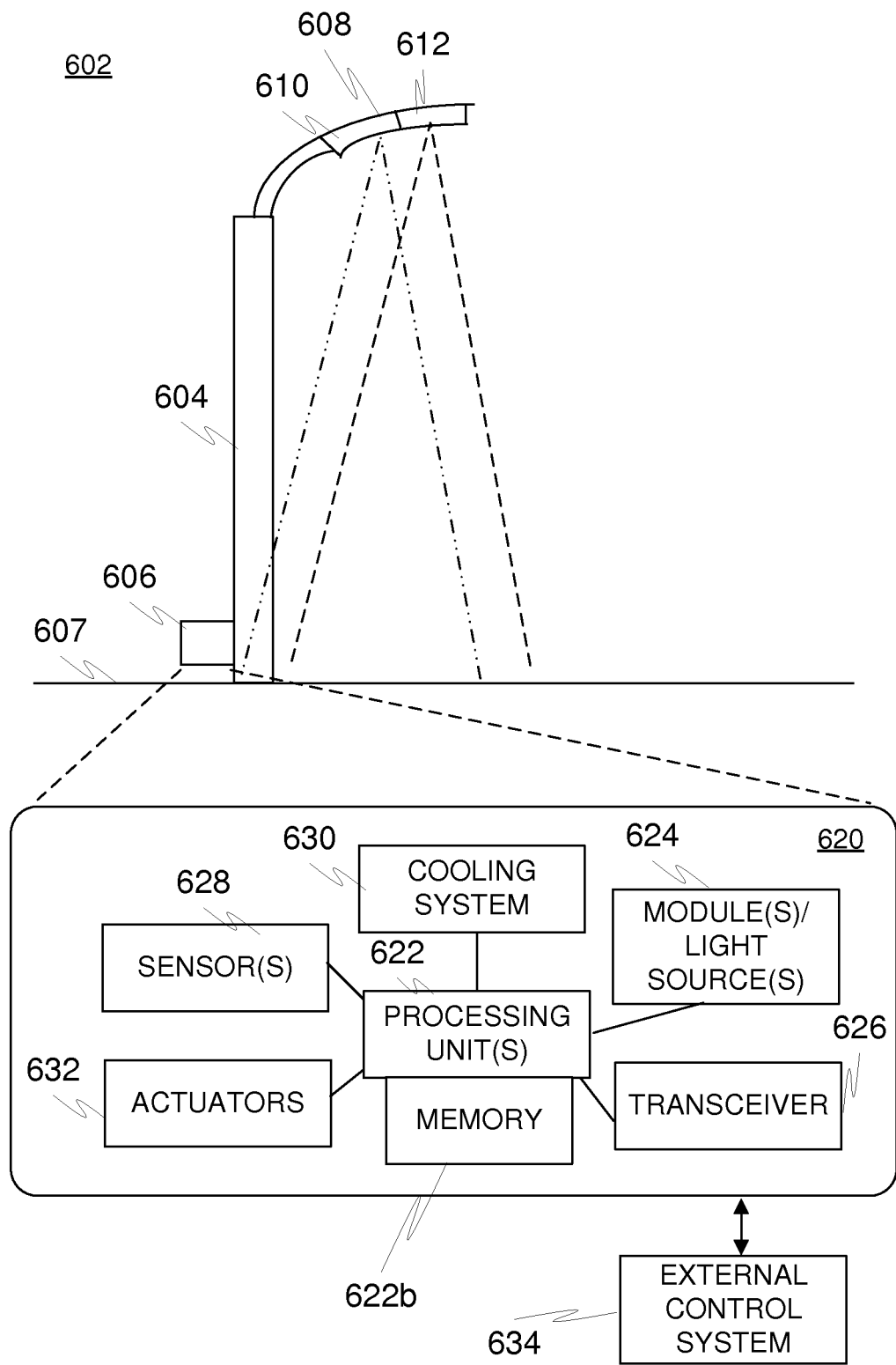
FIG. 6 illustrates an embodiment of a luminaire with few internal or at least functionally connected components depicted.

FIG. 6 illustrates an embodiment of a luminaire 602 with few internal or at least functionally connected components depicted. The luminaire 602 is in this example intended for outdoor lighting, specifically e.g. street lighting.

The luminaire 602, or 'lamppost', in question contains or is connected to a pole 604 with a light emitting portion 608 placed thereon with a number of modules 610, 612 that have their independent configuration or at least configurability as indicated in the figure by the roughly sketched beam angles (defined by dotted lines) with clearly different alignment, e.g. near-field (e.g. substantially under the luminaire/light source) and far-field (farther away parallel to or along the road) separation, for instance.

The luminaire 602 further contains other elements such as electronics and e.g. (electrical) power interface. The luminaire 602 may be powered through electrical cabling from an external power source, for instance. Alternatively or additionally, it may contain a power source of its own, e.g. a battery and/or photovoltaic cell (solar cell). Such other elements may be located within the pole 604, raised portion 608 and/or a separate housing 606 that may be fastened to the luminaire 602 and/or be located on or under the ground/support surface 607, for example.

Embedded block diagram 620 shows few elements the many embodiments of the luminaire in accordance with the present invention may selectively contain.

Some of the shown elements may be shared by all or at least several lighting module(s) 610, 612 of the luminaire and control the luminaire 602 as a whole, whereas the modules may alternatively or additionally contain similar dedicated elements for locally optimizing the function of the associated light sources based on internal and/or external signals/data such as program instructions or sensor signals/data, for example. At least some of the dedicated elements may be positioned close to the module(s), optionally inside them. Therefore, the block 624 has been allocated a dual nature in the figure as it may refer to controlled light modules 610, 612 or controlled light source(s) within the modules 610, 612. Each light source such as a LED within a module 610, 612 may further contain e.g. control electronics (so-called driver etc.) of its own.

A number of processing units 622 with integral or external memory 622b may be provided to control the functioning of the luminaire in accordance with instructions stored in the memory 622b and/or received from external control systems or devices 634.

One or more sensors 628 may be applied to provide dynamic input about the environment and/or condition of the luminaire 602 itself for enabling active lighting and generally dynamic, adaptive control over the adjustable features of the luminaire 602. For example, a moving item within the range of a motion detector (which may be optical, infrared, camera image/pattern detection based, etc.) may trigger dynamic control of light sources e.g. in terms of alignment (follow the target) and/or luminous flux (increase), whereas the lack of moving items within the detection range could convert into opposite control measures such as decrease in the radiated light.

Cooling system 630 may comprise besides passive elements (heat sink, etc.), also active features such as electric fan(s), which may be controlled responsive to e.g. temperature or other sensor signal obtained from an associated sensor in connection with light source(s), for instance.

Transmitter, receiver and/or transceiver 626, i.e. a communications interface, may be applied for data transfer (control data reception, status or sensor data transmission, etc.) with external elements such as other luminaires and/or external control system 634, which may be local, regional or national, for instance. Wireless and/or wired data transfer capability may be implemented. The system 634 may be configured to control a plurality of luminaires 602. A control action or 'command' may be luminaire-specific and/or concern multiple luminaires 602. The transferred signals/data such as control commands may be addressed by means of id's as discussed hereinbefore. The control/data transfer may be implemented in connection with electrical signal used for e.g. powering the luminaire 602 and related light sources, or separate therefrom.

A number of actuators 632, driven by e.g. servo motors, may be provided to enable automated or remotely controlled physical adjustments such as (re-)alignment of the modules and/or associated light sources, lens structures, and/or other elements.

Figure 7:
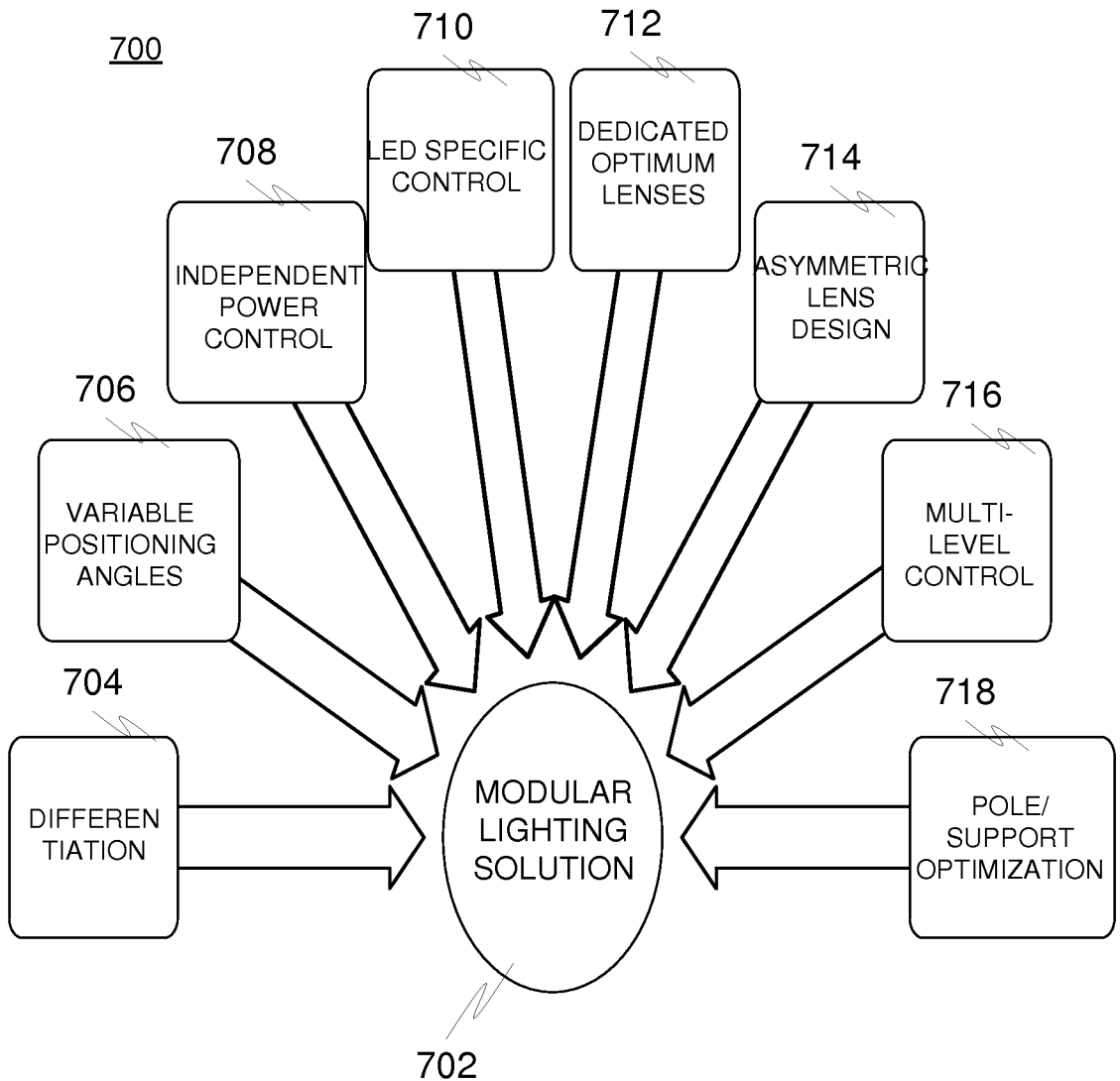
FIG. 7 generally illustrates various advantageous components of an embodiment of the suggested lighting solution comprising a number of luminaires and associated modules presented herein.

FIG. 7 generally illustrates at 700 various advantageous ingredients of an embodiment of the suggested lighting solution comprising a number of luminaires and associated modules described herein.

The obtained solution 702 can be physically and functionally implemented as modular due to various preferable features that may be selectively adopted in each embodiment of a luminaire or a system of multiple luminaires in accordance with the present invention. Accordingly, the solution may be optimized for most, if not all, illumination classes e.g. in street lighting context without undue burden.

Item 704 refers to configurability what comes to the nature of the lighting modules utilized. Separate, optionally mutually different, preferably independently controllable modules may be together utilized in the same luminaire for dedicated purposes such as near-field and far-field illumination, which usually provides superior results over using identical bulk modules in the same manner for every possible purpose.

Item 706 refers to variable position angles of the modules, which may be implemented by dimensioning the actual modules differently, positioning the included lighting apparatuses (containing light sources and related optics) within the modules differently, and/or (structurally) aligning the modules differently in the host structure or body of the associated luminaire as described in more detail elsewhere herein, for instance.

In some embodiments, the positioning or alignment of modules and/or lighting apparatuses included therein may even be dynamically varied, optionally automatically based on e.g. local sensor data or responsive to potentially manually triggered remote control command. For the purpose, e.g. a number of servo-controlled adjustment elements or platforms may be utilized.

Item 708 refers to preferred independent (power) control of modules. Each module may be provided with at least one dedicated control channel through which control signals such as power signals or dedicated signalling from e.g. luminaire-specific central controller are conveyed. The channel(s) may be physically dedicated (separate wires/cabling) and/or functionally dedicated (e.g. predefined protocol based, targeted signalling may be used on a shared transfer medium such as wired or wireless medium (typically air)).

Accordingly, preferably also each light source, such as a LED, of a module may be controlled individually 710.

Each module may comprise specially designed (with predefined optical features, etc.) lens structures or lens matrix/matrices 712.

Yet, the lenses may be configured as contemplated hereinbefore to achieve asymmetric illumination properties even independently for each LED or other light (radiation) source 714.

All these different aspects of configurability provide for even dynamically achieving optimum functional design (module level, light source/LED, lenses, etc.) having regard to the preferred illumination targets or generally illumination objectives, which may be e.g. road-class specific in the context of street lighting 716.

Also the support structures such as poles in connection with street lights or generally outdoor lights may be optimized in view of relevant design factors such as (installation) height, mutual distance, transverse arm/portion inclination, transverse arm/portion length 718.

Figure 8:
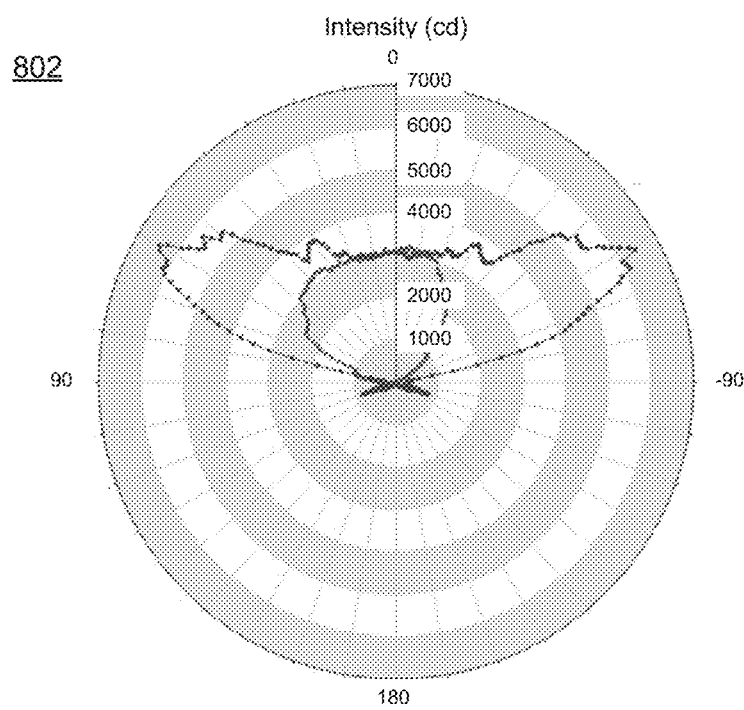
FIG. 8 illustrates two illumination diagrams relative to luminous intensity (cd) prior to and after fine-tuning the embodiment of the associated luminaire through the control of e.g. light source currents, position angles and asymmetric lens design in the modules thereof.
Figure 8:
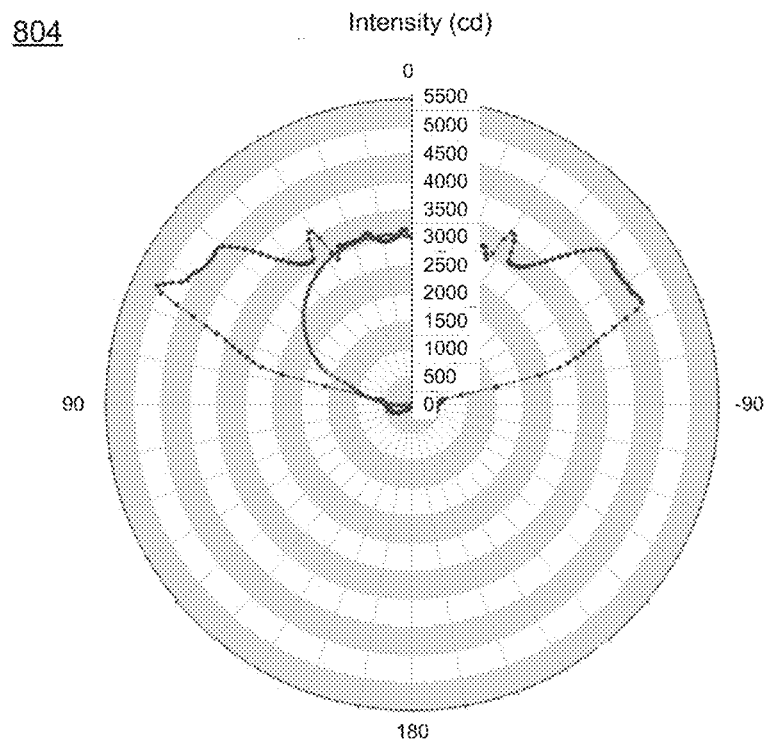

FIG. 8 illustrates two polar illumination diagrams 802, 804 relative to luminous intensity (cd) distribution prior to and after fine-tuning the associated luminaire, essentially a street light, following an embodiment of the present invention through the control of e.g. light source currents, constructive module position angles and asymmetric lens design in the modules thereof.

In the above diagram 802, the illumination distribution curve in lengthwise (street) direction is a bit undefined or unstructured in terms of light pollution to the sky and dazzle light is caused for the vehicle drivers in far-field illumination, whereas in the bottom diagram 804 showing the situation after optimization performed through optimization of light source currents, position angles and asymmetric lens design, the distribution curve has minimized light pollution (loops over +/−90 degree) and lower peak angle in far-field illumination with minimized dazzle light.

Figure 10A:
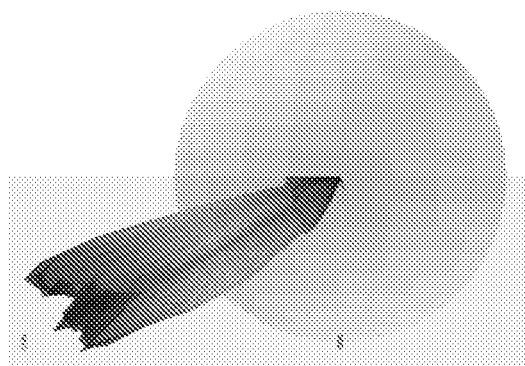
FIG. 10A illustrates achievable far-field illumination in accordance with an embodiment of the present invention.
Figure 10B:
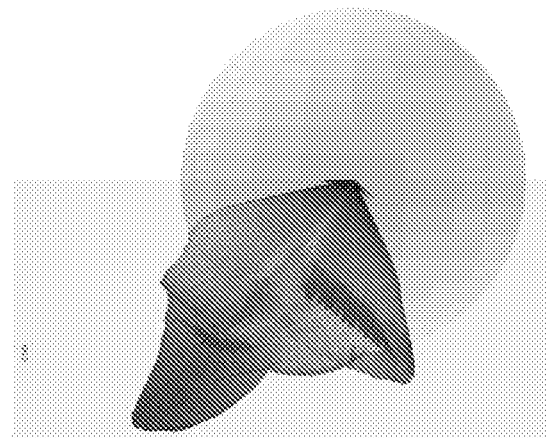
FIG. 10B illustrates achievable near-field illumination in accordance with an embodiment of the present invention.
Figure 10C:
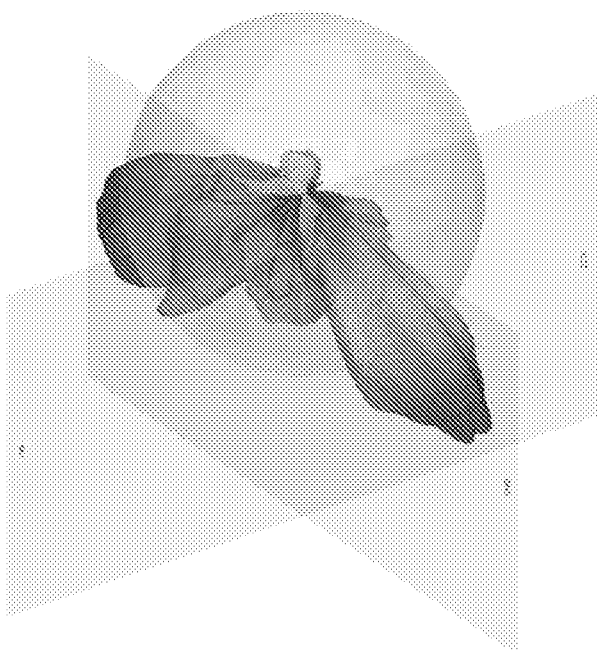
FIG. 10C illustrates the combined far-field and near-field plot in accordance with an embodiment of the present invention.

FIGS. 10A, 10B, and 10C further depict examples of achievable illumination distributions via far-field, near-field and combined plots, respectively.

By the solutions of different embodiments of the present invention, different illumination objective(s) and targets, such as target areas or surfaces in the environment of the luminaire, which preferably comprises multiple individually and advantageously dynamically configurable light source modules, may be illuminated e.g. uniformly by producing asymmetric light distribution by the luminaire through related control of associated modules.

Figure 9:
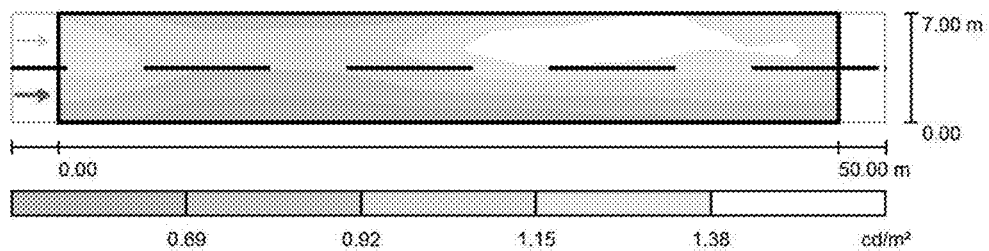
FIG. 9 illustrates two DIALux™ models for street/road illumination in accordance with an embodiment of the present invention.
Figure 9:
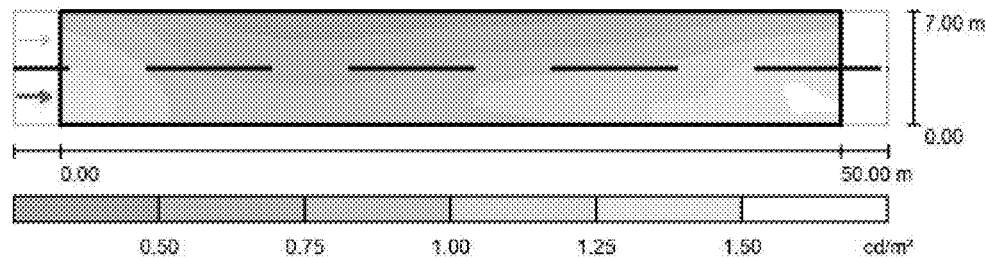

FIG. 9 illustrates two DIALux™ models for street/road illumination with varied parameters determined based on an embodiment of the luminaire in accordance with the present invention.

In the above scenario 902, the determined luminance values (top row) meet the requirements whereas in the lower scenario 904 representing situation prior to optimization of the adjustable parameters of the luminaire in question (with reference to the electrical, optical and e.g. mechanical adjustment possibilities described hereinearlier), first and third value do not reach acceptable thresholds.

The optimized solution 902 may be achieved from the sub-optimum solution 904 e.g. upon installation of the luminaire with the help of the aforementioned software based design and/or simulation tool, for example. The tool may be provided with known parameters regarding the target environment/use case (e.g. road class and potentially other parameters), whereupon the tool is adapted to suggest optimum adjustment values for the adjustable parameters/measures of the known luminaire.

The invention claimed is:

1. A luminaire incorporating a plurality of lighting module units, each module comprising:
   a plurality of light sources; and
   each light source having a lens structure associated therewith, wherein the modules are individually configurable, and further wherein light output characteristics of each module of said plurality are individually controllable to yield a target overall asymmetric distribution of output light from the luminaire, wherein a single light source structure includes asymmetric lens design, and wherein the light output characteristics of at least one module of said plurality and/or of at least one individual light source within such module are individually controllable in terms of at least one associated property selected from a group consisting of: current supplied, voltage supplied, power supplied, radiant flux, luminous flux, luminous intensity, illuminance, and luminance.

2. The luminaire of claim 1, wherein one or more modules of the plurality of lighting module units are dynamically configurable responsive to a change in environment of the luminaire and/or to a control signal received from an external device.

3. The luminaire of claim 1, comprising a support structure relative to which a positioning angle of at least one module of said plurality is constructively adjustable, wherein the support structure includes at least a body and pole.

4. The luminaire of claim 1, wherein positioning angles of one or more modules of said plurality are adjustable relative to a reference so as to achieve an optimum light distribution according to used criteria, wherein the reference includes at least body and pole or at least pole of the luminaire and environment of the luminaire.

5. The luminaire of claim 4, wherein the adjustability includes electrical, optical and/or mechanical adjustability.

6. The luminaire of claim 1, wherein at least one module has been configured for a first illumination segment and at least one other module for a second illumination segment.

7. The luminaire of claim 1, wherein at least two modules of said plurality contain mutually at least partially different lenses or lens matrices.

8. The luminaire of claim 1, comprising at least two light sources of different emission wavelengths.

9. The luminaire of claim 1, wherein at least two modules have been positioned mutually differently in terms of their alignment.

10. The luminaire of claim 1, comprising one or more advantageously variable cooling elements at one or more modules of said plurality.

11. The luminaire of claim 1, comprising at least one sensor, the luminaire being configured to apply sensor output in dynamically changing operation parameters thereof.

12. A system comprising a number or plurality of luminaires according to claim 1, and a remote central control system or apparatus for controlling and monitoring those.

13. A lighting apparatus comprising a single point-like light source, and a transmissive lens structure optically connected to said light source defining a plurality of optically functional, mutually different segments dedicated for controlling light distributed and directed from said single light source, wherein said lens structure is configured to produce asymmetric light distribution, wherein said lens structure includes asymmetric lens design, and wherein at least one segment comprises at least one optically functional feature selected from a group consisting of: surface relief form, surface relief pattern, surface relief grating, diffractive grating, diffractive profile, relief groove, relief protrusion, slanted relief profile, blazed relief profile, symmetric relief profile, asymmetric relief profile, refractive profile, and a number of refractive Fresnel profiles.

14. The apparatus of claim 13, wherein the segments are different in terms of at least one factor selected from a group consisting of: shape, size, volume, coating, and amount, density, placement, size, shape or alignment of optically functional structural features.

15. The apparatus of claim 13, wherein at least one segment comprises a number of embedded functional features and at least cavities and reliefs.

16. The apparatus of claim 13, wherein at least one segment is configured for establishing at least one optical function selected from a group consisting of: light directivity management, diffusion, collimation, diffraction, coloring, scattering, and distribution control.

17. The apparatus of claim 13, wherein at least one segment comprises a curved functional surface feature and circular feature of nested grooves or protrusions.

18. An optically transmissive element for at least connecting to a single point-like light source to form alighting apparatus therewith, said element defining a plurality of optically functional, mutually different segments dedicated for jointly controlling the light distributed and directed from said single light source, wherein the light distribution produced is asymmetric, wherein a single light source structure includes asymmetric lens design, and wherein at least one segment comprises at least one optically functional feature selected from a group consisting of: surface relief form, surface relief pattern, surface relief grating, diffractive grating, diffractive profile, relief groove, relief protrusion, slanted relief profile, blazed relief profile, symmetric relief profile, asymmetric relief profile, refractive profile, and a number of refractive Fresnel profiles.

19. A luminaire incorporating a plurality of lighting module units, each module comprising:
   a plurality of light sources; and
   each light source having a lens structure associated therewith, wherein the modules are individually configurable, and further wherein light output characteristics of each module of said plurality are individually controllable to yield a target overall distribution of output light from the luminaire, wherein at least one segment comprises a curved functional surface feature and circular feature of nested grooves or protrusions.

* * * * *